United States Patent

Ur

(10) Patent No.: US 9,998,411 B2
(45) Date of Patent: Jun. 12, 2018

(54) RESTRICTION OF POSTING INFORMATION TO SHARING PROCESSORS

(71) Applicant: EMPIRE TECHNOLOGY DEVELOPMENT LLC, Wilmington, DE (US)

(72) Inventor: Shmuel Ur, Galil (IL)

(73) Assignee: EMPIRE TECHNOLOGY DEVELOPMENT, LLC, Wilmington, DE (US)

( * ) Notice: Subject to any disclaimer, the term of this patent is extended or adjusted under 35 U.S.C. 154(b) by 0 days. days.

(21) Appl. No.: 13/981,544

(22) PCT Filed: May 17, 2013

(86) PCT No.: PCT/US2013/041584
§ 371 (c)(1),
(2) Date: Jul. 24, 2013

(87) PCT Pub. No.: WO2014/185930
PCT Pub. Date: Nov. 20, 2014

(65) Prior Publication Data
US 2014/0344362 A1    Nov. 20, 2014

(51) Int. Cl.
*G06F 15/16* (2006.01)
*H04L 12/58* (2006.01)

(52) U.S. Cl.
CPC .................... *H04L 51/12* (2013.01)

(58) Field of Classification Search
CPC ..................................... H04L 51/12
USPC ......................................... 709/229, 230, 231
See application file for complete search history.

(56) References Cited

U.S. PATENT DOCUMENTS

| | | | |
|---|---|---|---|
| 8,165,799 B2 * | 4/2012 | Snavely et al. | 701/400 |
| 2008/0082381 A1 * | 4/2008 | Muller | G06Q 20/145 705/344 |
| 2008/0162170 A1 | 7/2008 | Kumar et al. | |
| 2009/0217344 A1 * | 8/2009 | Bellwood et al. | 726/1 |
| 2011/0202968 A1 * | 8/2011 | Nurmi | 726/1 |
| 2011/0321167 A1 | 12/2011 | Wu et al. | |
| 2012/0250951 A1 | 10/2012 | Chen | |

OTHER PUBLICATIONS

How to Tether a Cell Phone, retrieved from http://electronics.howstuffworks.com/how-to-tether-a-cell-phone.htm, copyright 1998-2013, 2 pages.
Bluetooth Distance, tom's Hardware, retrieved from http://www.tomshardware.com/forum/50621-36-bluetooth-distance, copyright 1999-2013, 2 pages.

(Continued)

*Primary Examiner* — Normin Abedin

(57) ABSTRACT

Methods and systems effective to restrict posting of information to a sharing processor are generally described. A device may receive a request to post captured information to a sharing processor. The device may receive a restriction request and determine that the restriction request is applicable to the information. In response to determining that the restriction request is applicable to the information, the device may output a privacy message through a user interface of the device. The privacy message may provide an indication that the restriction request is applicable to the information.

24 Claims, 7 Drawing Sheets

(56) References Cited

OTHER PUBLICATIONS

Balasubramanian, N., et al., Energy Consumption in Mobile Phones: A Measurement Study and Implications for Network Applications, IMC' 09, Nov. 2009, 14 pages.

McClain, S., Comparison Between Bluetooth & Wifi, eHow, retrieved from http://www.ehow.com/about_6367998_comparison-between-bluetooth-wifi.html, copyright 1999-2013, 4 pages.

International Search Report for PCT application with application No. PCT/US2013/041584, dated Jun. 18, 2013, 5 pages.

Talukder, N., "Privometer: Privacy protection in social networks," In proceeding of: Workshops Proceedings of the 26th International Conference on Data Engineering, ICDE 2010, Mar. 1-6, 2010, 4 pages.

Bluejacking, retrieved from http://en.wikipedia.org/wiki/Bluejacking, Nov. 2, 2012, 3 pages.

Bilton, N., "Disruptions: Seeking Privacy in a Networked Age," Oct. 14, 2012, retrieved from http://bits.blogs.nytimes.com/2012/10/14/seeking-privacy-in-a-networked-age/, 6 pages.

Jakob, M., "Intelligent Content-based Privacy Assistant for Facebook," in Proceedings of the 2011 IEEE/WIC/ACM International Joint Conference on Web Intelligence and Intelligent Agent Technology, 2011, 2 pages.

"Gartner Survey Highlights Consumer Fatigue with Social Media," Aug. 15, 2011, retrieved from http://www.gartner.com/newsroom/id/1766814, 3 pages.

Gundecha, P., "Exploiting Vulnerability to Secure User Privacy on Social Networking Site," in Proceedings of the 17th ACM SIGKDD International Conference on Knowledge Discovery and Data Mining, 2011, pp. 511-519.

International Written Opinion for PCT application with application No. PCT/US2013/041584, dated Jun. 18, 2013, 3 pages.

Felt, A. P., and Evans, D., "Privacy Protection for Social Networking APIs," Workshop on Web 2.0 Security and Privacy (W2SP), 2008, pp. 1-8.

"User Survey Analysis: Trends in Consumers' Use of Social Media," Retrieved from URL: https://web.archive.org/web/20130116021150/http://www.gartner.com/DisplayDocument?ref=clientFriendlyUrl&id=1724424, on Dec. 3, 2014, posted on Jun. 14, 2011, pp. 1-2.

* cited by examiner

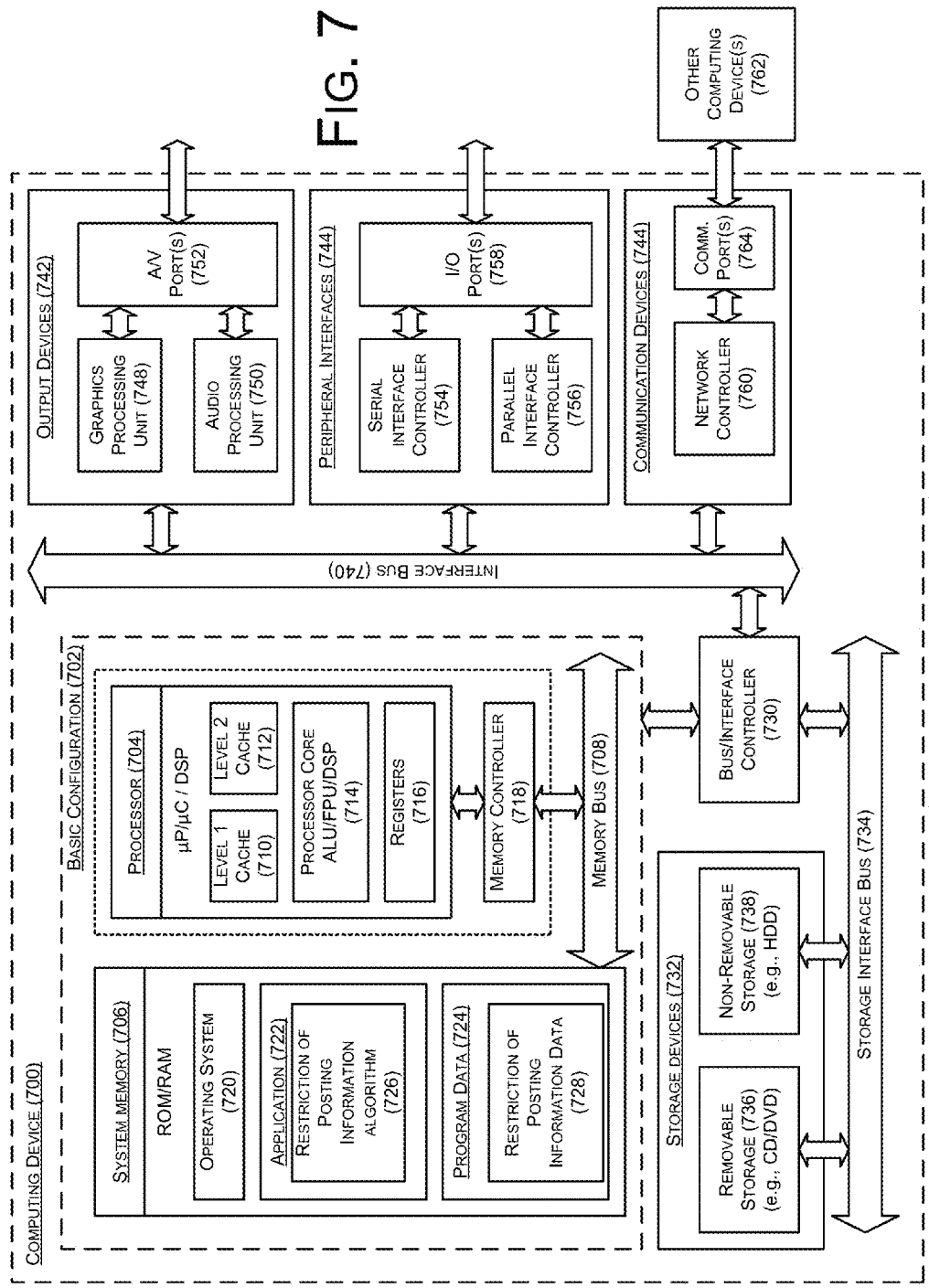

RESTRICTION OF POSTING INFORMATION TO SHARING PROCESSORS

CROSS REFERENCE TO RELATED APPLICATIONS APPLICATION

This application is a U.S. National Stage filing under U.S.C. § 371 of International Application No. PCT/US13/41584 filed May 17, 2013, the entirety of which is hereby incorporated by reference.

BACKGROUND

Unless otherwise indicated herein, the materials described in this section are not prior art to the claims in this application and are not admitted to be prior art by inclusion in this section.

Mobile devices can be used to capture information such as images, video, etc. Mobile devices can further be used to post captured information to a sharing processor such as a social network web site. The captured information may relate to persons other than the person posting the information to the sharing processor.

SUMMARY

In some examples, methods for processing a request to restrict posting of information are generally described. The methods may include capturing information by a device. The methods may further include receiving, by the device, a request to post the information to a sharing processor. The methods may further include receiving, by the device, a restriction request. The methods may further include determining that the restriction request is applicable to the information. The methods may further include, in response to determining that the restriction request is applicable to the information, outputting a privacy message through a user interface of the device. The privacy message may provide an indication that the restriction request is applicable to the information.

In some examples, devices effective to process a request to restrict posting of information are generally described. The devices may include an information capture device, a module, a user interface and/or a processor. The information capture device may be effective to capture information. The module may be effective to receive a request to post the information to a sharing processor, and to receive a restriction request. The devices may further comprise a processor configured to be in communication with the information capture device, the module and with the user interface. The processor may be effective to determine that the restriction request is applicable to the information. The processor may be further effective to, in response to the determination that the restriction request is applicable to the information, output, through the user interface, a privacy message. The privacy message may provide an indication that the restriction request is applicable to the information.

In some examples, systems effective to restrict posting of information are generally described. The systems may comprise a first device and a second device. The second device may be configured to be in communication with the first device. The second device may be effective to send a restriction request. The first device may comprise a memory, a user interface, and a processor. The processor may be configured to be in communication with the memory and the user interface. The first device may be effective to capture information. The processor may be effective to receive a request to post the information to a sharing processor. The processor may be further effective to receive the restriction request. The processor may be further effective to determine that the restriction request is applicable to the information. The processor may be further effective to, in response to the determination that the restriction request is applicable to the information, output, through the user interface, a privacy message. The privacy message may provide an indication that the restriction request is applicable to the information.

In some examples, a computer program product, comprising software encoded in non-transitory computer-readable media, for processing a request to restrict posting of information are generally described. The software may comprise instructions, operable when executed, to capture information by a device. The software may comprise further instructions, operable when executed, to receive, by the device, a request to post the information to a sharing processor. The software may comprise further instructions, operable when executed, to receive, by the device, a restriction request. The software may comprise further instructions, operable when executed, to determine that the restriction request is applicable to the information. The software may further comprise instructions, operable when executed to, in response to the determination that the restriction request is applicable to the information, output a privacy message through a user interface of the device. The privacy message may include at least some of the restriction request.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

FIG. 7 is a block diagram illustrating an example computing device that is arranged to implement restriction of posting information to sharing processors; all arranged in accordance with at least some embodiments described herein.

DETAILED DESCRIPTION

Figure 1:
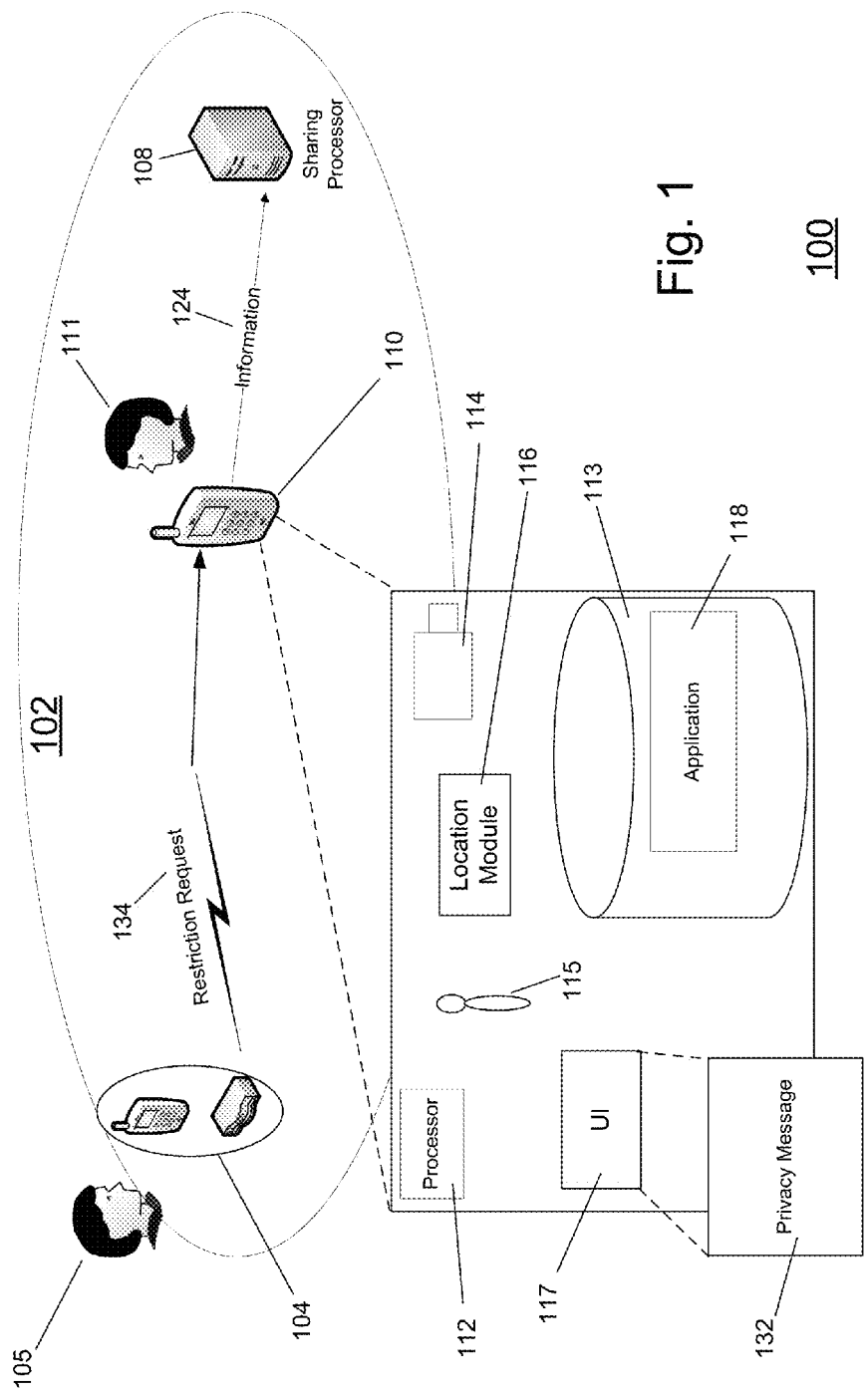
FIG. 1 illustrates an example system that can be utilized to implement restriction of posting information to sharing processors.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. The aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices, and computer program products related to implementing restriction of posting information to sharing processors.

Briefly stated, methods and systems effective to restrict posting of information to a sharing processor are generally described. A device may receive a request to post captured information to a sharing processor. The device may receive a restriction request and determine that the restriction request is applicable to the information. In response to determining that the restriction request is applicable to the information, the device may output a privacy message through a user interface of the device. The privacy message may provide an indication that the restriction request is applicable to the information.

Some of the benefits of the disclosure may include restriction of information that may be posted to sharing processors. People may wish to restrict information about them that may be posted to sharing processors. For example, if a host invites guests over to her home, she may prefer not to have the guests post pictures of her face or her home to sharing processors. In another example, the operator of a movie theater may prefer that customers of the movie theater not post images or sound recordings taken in the movie theater. In another example, an organization holding a meeting where non-public information is discussed may prefer to restrict posting of that information to sharing processors. By using the various implementations of the system described herein, these problems, among others, may be addressed.

FIG. 1 illustrates an example system that can be utilized to implement restriction of posting information to sharing processors arranged in accordance with at least some embodiments described herein. In some examples, a system 100 may include one or more privacy control devices 104, and/or one or more posting devices 110, configured to be in communication over a network 102. Privacy control devices 104 may be controlled by one or more privacy control users 105. Posting device 110 may be controlled by one or more posting device users 111.

In some examples, network 102 may be, or include, one or more networks such as the Internet network or a cellular network. In some examples, network 102 may be, or include, a local area network (LAN), a personal area network (PAN), a wide area network (WAN), and/or a BLUETOOTH network. The network 102 may include wireless, wired, and/or both wired and wireless communication links.

Privacy control device 104 may be, for example, a stand-alone device, a software or hardware component of a device, a computer, a mobile device, a mobile phone, a tablet device, a device that may communicate with the Internet, etc. Posting device 110 may be, for example, a computer, a mobile device, a mobile phone, a tablet device, a device that may communicate with the Internet, etc. Posting device 110 may include one or more modules. The modules may include some, or all, of a processor 112, a memory 113, an information capture device, and/or a user interface ("UI") 117. The information capture device may include some, or all, of a camera 114, a microphone 115, and/or a location module 116. Memory 113 may include an application 118 Posting device 110 may be configured to selectively post information 124 to a sharing processor 108. Application 118 may be configured to use an Application Programming Interface (API) related to sharing processor 108.

As discussed in more detail below, privacy control device 104 may send a restriction request 134 over network 102 to posting device 110. Restriction request 134 may include requests to restrict the posting of information 124 to sharing processor 108. Posting device 110 may receive restriction request 134 and may output a privacy message 132 on user interface 117 in response. Posting device user 111 may choose to post, or not post, information 124 based on privacy message 132.

Figure 2:
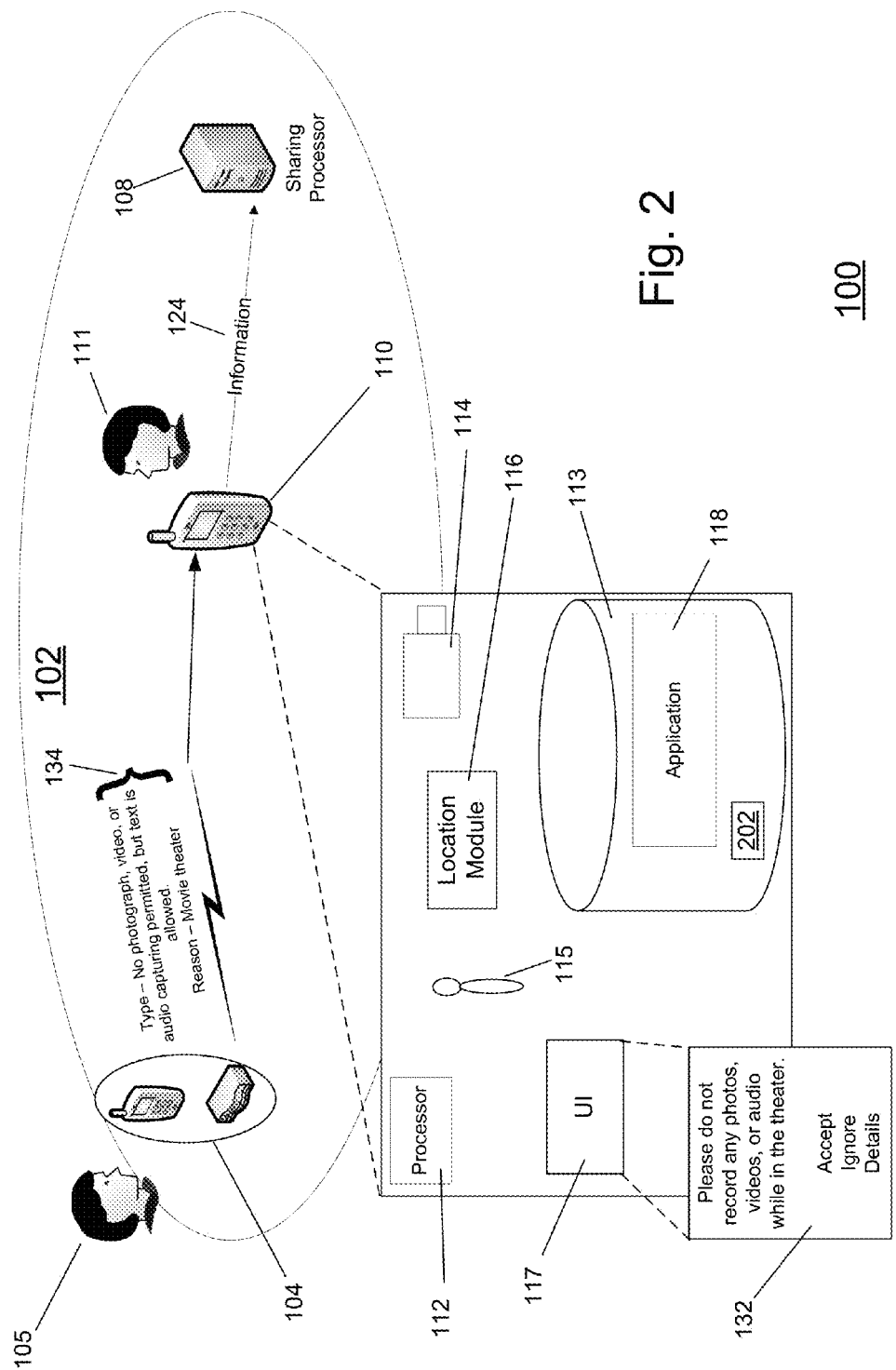
FIG. 2 illustrates the example system that can be utilized to implement restriction of posting information to sharing processors of FIG. 1, with further detail relating to a privacy control device that may repeatedly send a restriction request over a network.

FIG. 2 illustrates the example system that can be utilized to implement restriction of posting information to sharing processors of FIG. 1, with further detail relating to a privacy control device that may repeatedly send a restriction request over a network arranged in accordance with at least some embodiments described herein. Those components in FIG. 2 that are labeled identically to components of FIG. 1 will not be described again for the purposes of clarity and brevity.

Information 124 may include images (such as a photograph or video) that may have been captured by camera 114. Information 124 may include audio that may have been captured by microphone 115, a location of posting device 110 that may have been captured by location module 116, text or an image that may have been captured through user interface 117, etc. In examples when posting device 110 attempts to post information 124 to sharing processor 108, application 118 may first process restriction request 134 and output privacy message 132 on user interface 117.

Privacy message 132 may include at least some of restriction request 134. Privacy message 132 may be displayed on user interface 117 to be viewed by posting device user 111. Privacy message 132 may include a request to limit posting of information 124. Privacy message 132 may include options to accept, ignore, and/or ask for more details relating to restriction request 134. Posting device user 111 may view privacy message 132 and select, such as through user interface 117, whether to post information 124 to sharing processor 108 based on privacy message 132. For example, posting device user 111 can accept restriction request 134 identified in privacy message 132 and control posting device 110 to not post information 124 to sharing processor 108. Posting device user 111 may ignore restriction request 134 and control posting device 110 to post information 124 to sharing processor 108. Posting device user 111 may ask for more details relating to restriction request 134. In response to a request for more details, application 118 may control user interface 117 to output a privacy reason included in restriction request 134 on user interface 117. In some embodiments, posting device user 111 may post a portion of information 124, not post another portion of information 124, and/or ask for more details about one or more portions of information 124.

Restriction request 134 may include a type of restriction, a reason for the restriction, a type of information being restricted, a sample of information being restricted, and/or other content. An example type of restriction may be a restriction based on the location where information 124 was captured. For example, restriction request 134 may indicate that privacy control user 105 wishes to restrict posting information captured at a defined location. Restriction request 134 may include a definition of the defined location—such as by GPS (global positioning system) coordinates, a postal address, a radius of locations centered around a defined location, etc.

An example type of information in restriction request 134 may be a photograph or video. For example, restriction request 134 may request that images of the face of privacy control user 105 or their house or other property not be posted. Restriction request 134 may include restrictions based on time. For example, restriction request 134 may request restriction of posting information 124 during defined time intervals, or request that any information 124 captured not be posted until a defined time.

An example reason for restriction request 134 may be that privacy control user 105 does not want his or her picture posted on the Internet or does not wants pictures of their minor child posted. The reason may be displayed on user interface 117 in examples when posting device user 111 asks for more details regarding restriction request 134. The reason for the restriction may help convince posting device user 111 to accept restriction request 134 and not send information 124 to sharing processor 108.

In an example, restriction request 134 may indicate that photographs may be allowed to be posted but not video. In another example, restriction request 134 may indicate that no images may be posted to a sharing processor but text may be posted. A sample may be included in restriction request 134. For example, if posting an image of a particular face is restricted, restriction request 134 may include a sample image of the particular face. In some examples, application 118 may process the sample in restriction request 134 and process information 124 to determine if restriction request 134 is applicable to information 124. Application 118 may use image processing software to compare the sample in restriction request 134 with information 124. In other examples, application 118 may display the sample on user interface 117 and let posting device user 111 determine whether restriction request 134 is applicable to information 124.

In an example, restriction request 134 may request restriction of posting of images of a particular face. Restriction request 134 may include a sample photograph of the particular face. Restriction request 134 may be applicable to information 124 if information 124 includes a photograph of the particular face. The particular face in information 124 may be detected by posting device 110 such as by face recognition or other identity-recognition techniques. In another example, if restriction request 134 requests restriction of posting of information captured in a defined location, restriction request 134 may be applicable to information 124 if information 124 was captured in the defined location.

Privacy message 132 may include queries asking whether posting device user 111 wishes to post information 124 to sharing processor 108. Posting device 110 may store, in association with application 118, default responses to queries posed by privacy message 132. Example default responses may include: always accepting restriction request 134 and not posting information 124 to sharing processor 108; always ignoring restriction request 134 and continuing to post information 124 to sharing processor 108; always asking for more details relating to restriction request 134; and/or other default responses.

If posting device user 111 ignores restriction request 134, privacy control user 105 may choose to take social action against posting device user 111. Privacy control user 105 may, for example, choose to not allow posting device user 111 back to a property of privacy control user 105, or to not allow posting device user 111 to capture more information 124.

A protocol may be implemented to facilitate communication of restriction request 134 between privacy control device 104 and posting device 110 over network 102. The protocol may be a suitable network protocol used for communication between the devices on network 102, such as the IEEE 802.11 family of standards, the IEEE 802.16 family of standards, the TCP/IP (transmission control protocol/internet protocol) set of protocols, or any other protocol that may be usable for such purpose. The protocol may be a proprietary protocol designed specifically to facilitate communication of restriction request 134 between devices on network 102. The protocol may, for example, include specific network ports to allow inbound and/or outbound communication between devices on network 102.

Sharing processor 108 may be a processor configured to share information on the Internet such as, for example, FACEBOOK, GOOGLE+, TWITTER, FOURSQUARE, YOUTUBE, TUMBLR, INSTAGRAM, LINKEDIN, etc. Similarly, application 118 could be associated with sharing processor 108, such as an application associated with FACEBOOK, GOOGLE+, TWITTER, FOURSQUARE, YOUTUBE, TUMBLR, INSTAGRAM, LINKEDIN, etc. Application 118 could be separate from sharing processor 108 and may execute on posting device 110 independent of sharing processor 108.

In an example, system 100 may include one or more privacy control devices 104 that may repeatedly, such as continuously or periodically, send restriction request 134 over network 102. In the example shown in FIG. 2, restriction request 134 includes a restriction type ("No photograph, video, or audio capturing permitting, but text is allowed") and reason ("Movie theater"). Posting device 110 may capture information 124 in a movie theater. Application 118 may also cause posting device 110 to add at least part of restriction request 134 to information 124, such as by a tag 202.

Posting device 110 may process restriction request 134 when restriction request 134 is received. In other examples, posting device 110 may store restriction request 134 and process restriction request 134 after a time interval has passed. In the example, when posting device 110 captures information 124 while in the movie theater, tag 202 (including restriction request 134) may be added to information 124. When posting device user 111 attempts to post information 124 to sharing processor 108, application 118 may process tag 202 (including restriction request 134) and output privacy message 132 on user interface 117. Privacy message 132 may inform posting device user 111 of restriction requests 134. In the example, even if posting device user 111 has sought to post information 124 at a time interval after capturing information 124 and receiving restriction request 134, the use of tag 202 (including restriction request 134) may still allow posting device 110 to provide posting device user 111 with privacy message 132.

Posting device user 111 may then choose to accept restriction request 134 and not post information 124, ignore restriction request 134 and continue to post information 124, view more details regarding restriction request 134, and/or take some other action(s). If posting device user 111 ignores restriction request 134, privacy control device user 105 may take social action against posting device user 111, such as by not allowing posting device user 111 to come back to the movie theater, by requesting the owner/operator of the movie theater to not allow posting device user 111 to come back to the theater, and/or other social action.

Figure 3:
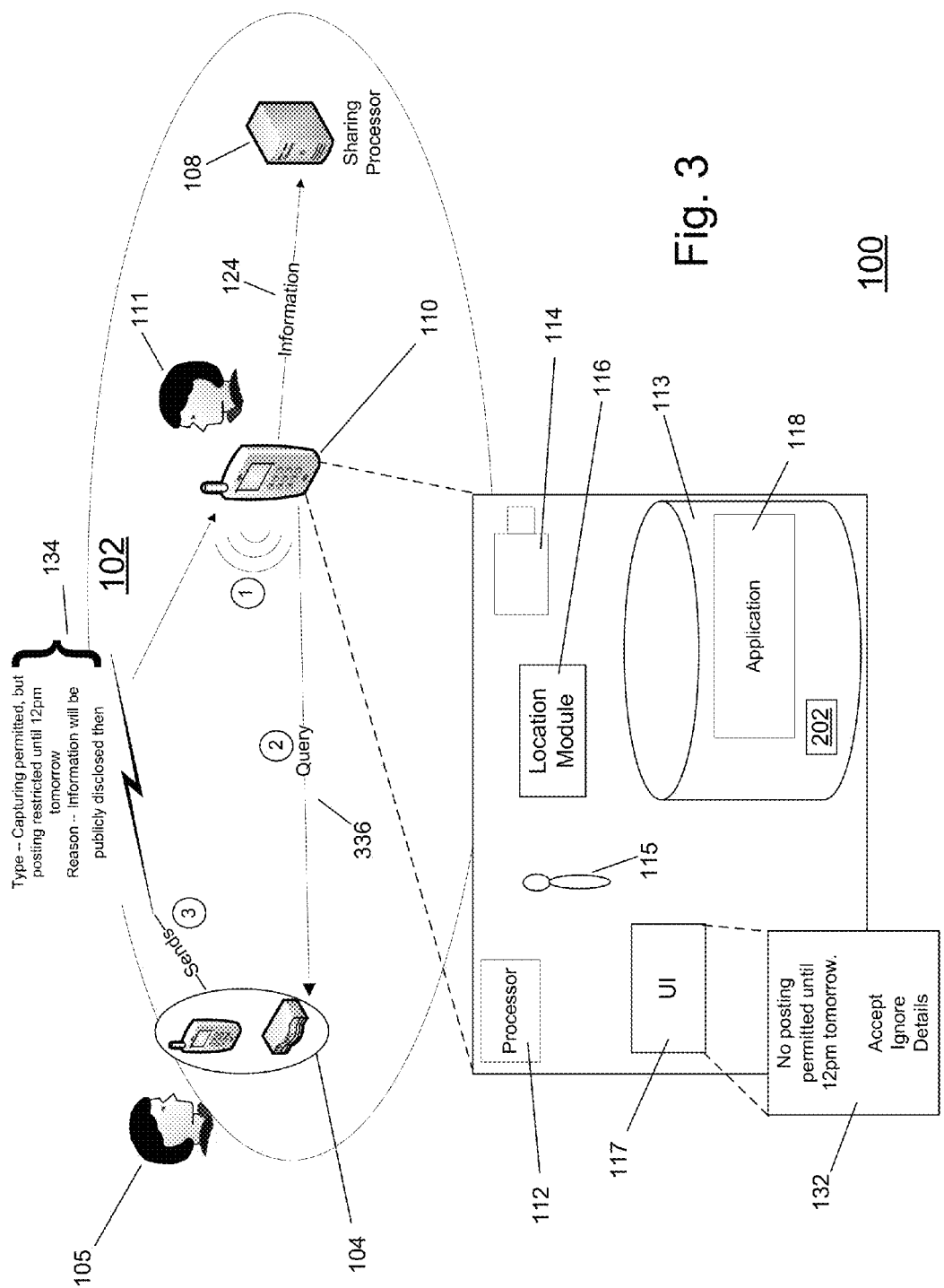
FIG. 3 illustrates the example system that can be utilized to implement restriction of posting information to sharing processors of FIG. 1, with further detail illustrating an example where a posting device sends a query for a restriction request over a network to the privacy control device.

FIG. 3 illustrates the example system that can be utilized to implement restriction of posting information to sharing processors of FIG. 1, with further detail illustrating an example where a posting device sends a query for a restriction request over a network to the privacy control device arranged in accordance with at least some embodiments described herein. Those components in FIG. 3 that are labeled identically to components of FIGS. 1 and 2 will not be described again for the purposes of clarity and brevity.

In the example shown in FIG. 3, restriction request 134 includes a restriction type ("Capturing permitted, but posting restricted until 12 pm tomorrow") and reason ("Information will be publicly disclosed then"). In an example, posting device 110 may search (highlighted by "1") network 102 for privacy control device 104 either while capturing information 124 or after capturing information 124. In examples where privacy control device 104 is detected by posting device 110, posting device 110 may send a query 336 (highlighted by "2") for restriction request 134 over network 102 to privacy control device 104. Data related to the captured information 124, such as metadata, may be included in the query 336. Upon receipt of query 336, privacy control device 104 may send restriction request 134 (highlighted by "3") over network 102 to posting device 110. In examples when posting device user 111 attempts to post information 124 to sharing processor 108, application 118 may process restriction request 134 and output privacy message 132 on user interface 117, informing posting device user 111 of restriction request 134. Posting device user 111 may then choose to accept restriction request 134 and not post information 124, ignore restriction request 134 and continue to post information 124, view more details regarding restriction requests 134, and/or other take some other action(s).

Figure 4:
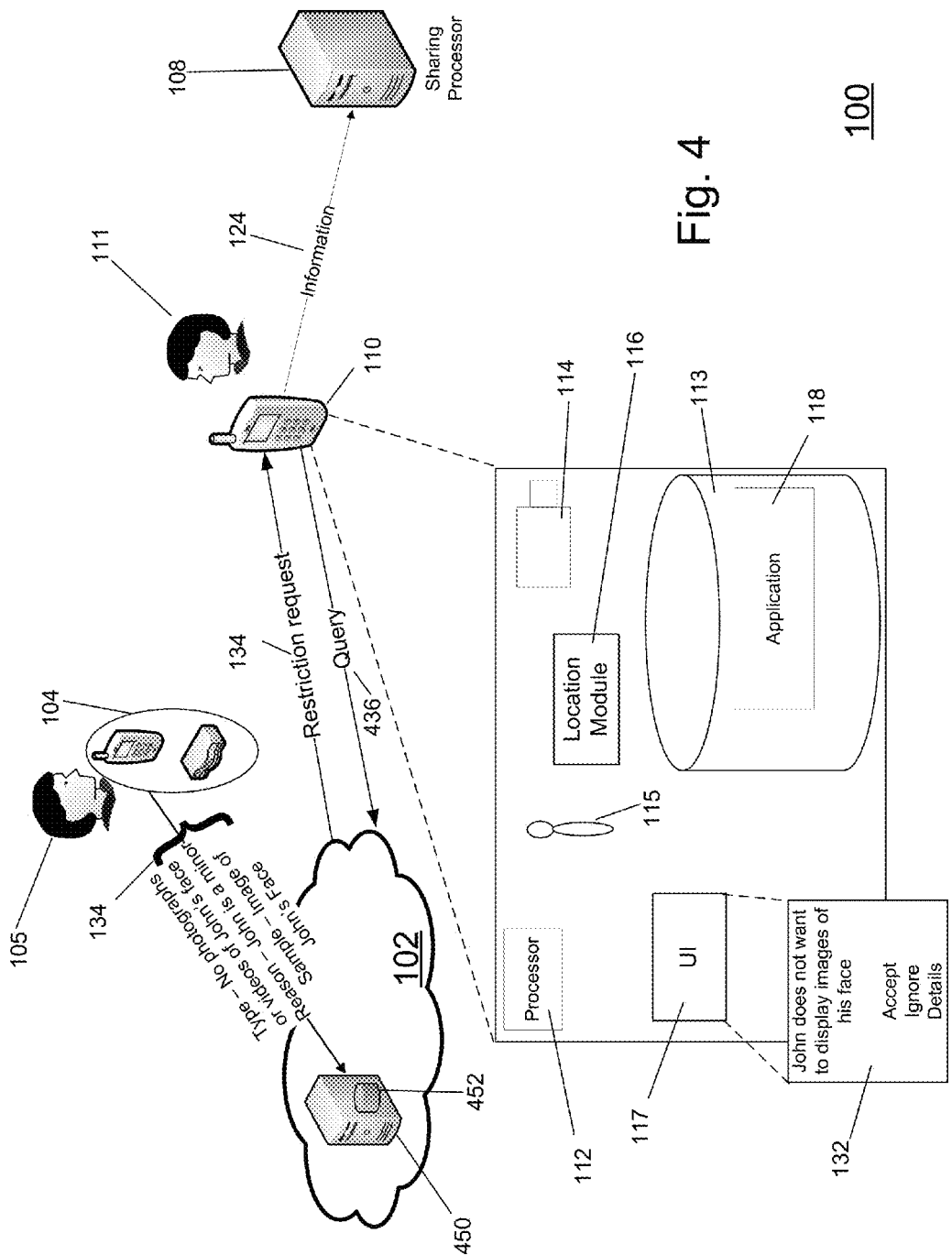
FIG. 4 illustrates the example system that can be utilized to implement restriction of posting information to sharing processors of FIG. 1, with further detail illustrating an example where the privacy control device may store the restriction request on a processor accessible over the Internet.

FIG. 4 illustrates the example system that can be utilized to implement restriction of posting information to sharing processors of FIG. 1, with further detail illustrating an example where the privacy control device may store the restriction request on a processor accessible over the Internet arranged in accordance with at least some embodiments described herein. Those components in FIG. 4 that are labeled identically to components of FIGS. 1, 2 and 3 will not be described again for the purposes of clarity and brevity.

In an example, restriction request 134 includes a restriction type ("No photographs or videos of John's face"), reason ("John is a minor") and a sample image of John's face. In an example, privacy control device 104 may send restriction request 134 over network 102 to a processor 450. Restriction request 134 may be stored in a memory 452 of processor 450. Processor 450 may be, for example, a processor in a cloud computing environment. In examples where posting device 110 captures information 124, posting device 110 may send query 436 for restriction request 134 to processor 450.

In some examples, query 436 includes some portions of information 124. Processor 450 may process query 436, including information 124, to determine if restriction request 134 may be applicable to information 124. In examples where restriction requests 134 are determined to be applicable to information 124, restriction requests 134 may be sent to posting device 110. In examples when posting device 110 attempts to post information 124 to sharing processor 108, application 118 may process restriction request 134 and may output privacy message 132 on user interface 117. Posting device user 111 may then choose to accept restriction request 134 and not post information 124, ignore restriction request 134 and continue to post information 124, view more details regarding restriction request 134, and/or take some other action(s). Posting device 110 may send query 436 to processor 450 when information 124 is captured, and/or when posting device user 111 attempts to post information 124 to sharing processor 108.

At least some portion of information 124 may be included with query 436. Processor 450 may use information 124 to determine which of two or more available restriction requests 134 are applicable to information 124. For example, query 436 may include a location of posting device 110. Processor 450 may analyze the location to identify which restriction requests 134 stored in memory 452 may be applicable to information 124. In examples where information 124 includes video, query 436 may include the video or some portion of the video. Processor 450 may compare frames of the video with samples of faces in available restriction requests 134, relating to restricting posting of images of faces, to determine which restriction requests 134 may be applicable to information 124.

Figure 5:
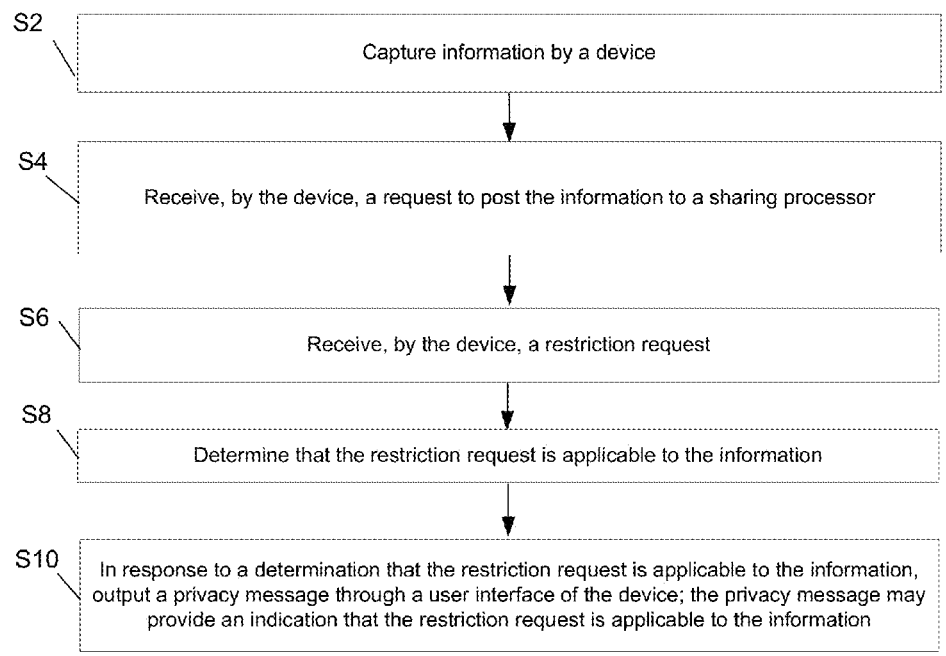
FIG. 5 depicts a flow diagram for an example process for implementing restriction of posting information to sharing processors.

FIG. 5 depicts a flow diagram for example processes for implementing restriction of posting information to sharing processors in accordance with at least some embodiments described herein. In some examples, the process in FIG. 5 could be implemented using, for example, system 100 discussed above.

An example process of a method for processing a request to restrict posting of information may include one or more operations, actions, or functions as illustrated by one or more of blocks S2, S4, S6, S8, and/or S10. Although illustrated as discrete blocks, various blocks may be divided into additional blocks, combined into fewer blocks, or eliminated, depending on the particular implementation. Further blocks representing other operations, actions, or functions may also be provided in other embodiments.

Processing may begin at block S2, "Capture information by a device." At block S2, a device (such as the posting device 110) may capture information. The information may include at least one of an image, audio, video, text and/or a location of the device.

Processing may continue from block S2 to block S4, "Receive, by the device, a request to post the information to a sharing processor." At block S4, the device may receive a request to post the information to a sharing processor.

Processing may continue from block S4 to block S6, "Receive, by the device, a restriction request." At block S6, the device may receive a restriction request (such as from the privacy control device 104). The restriction request may include a type of restriction, a reason for the restriction, a type of information being restricted, a sample of the information being restricted, and/or other content. The device may search the network for another device, send a request for the restriction request over the network and receive the restriction request in response. The restriction request may be added to the information and may be stored in the device.

Processing may continue from block S6 to block S8, "Determine that the restriction request is applicable to the information." At block S8, a determination may be made as to whether the restriction request is applicable to the information. The determination may be made by comparing at least some of the information to the restriction request.

Processing may continue from block S8 to block S10, "In response to a determination that the restriction request is applicable to the information, output a privacy message through a user interface of the device; the privacy message may provide an indication that the restriction request is applicable to the information." At block S10, the device may output, through a user interface, a privacy message. The privacy message may provide an indication that the restriction request is applicable to the information.

Figure 6:
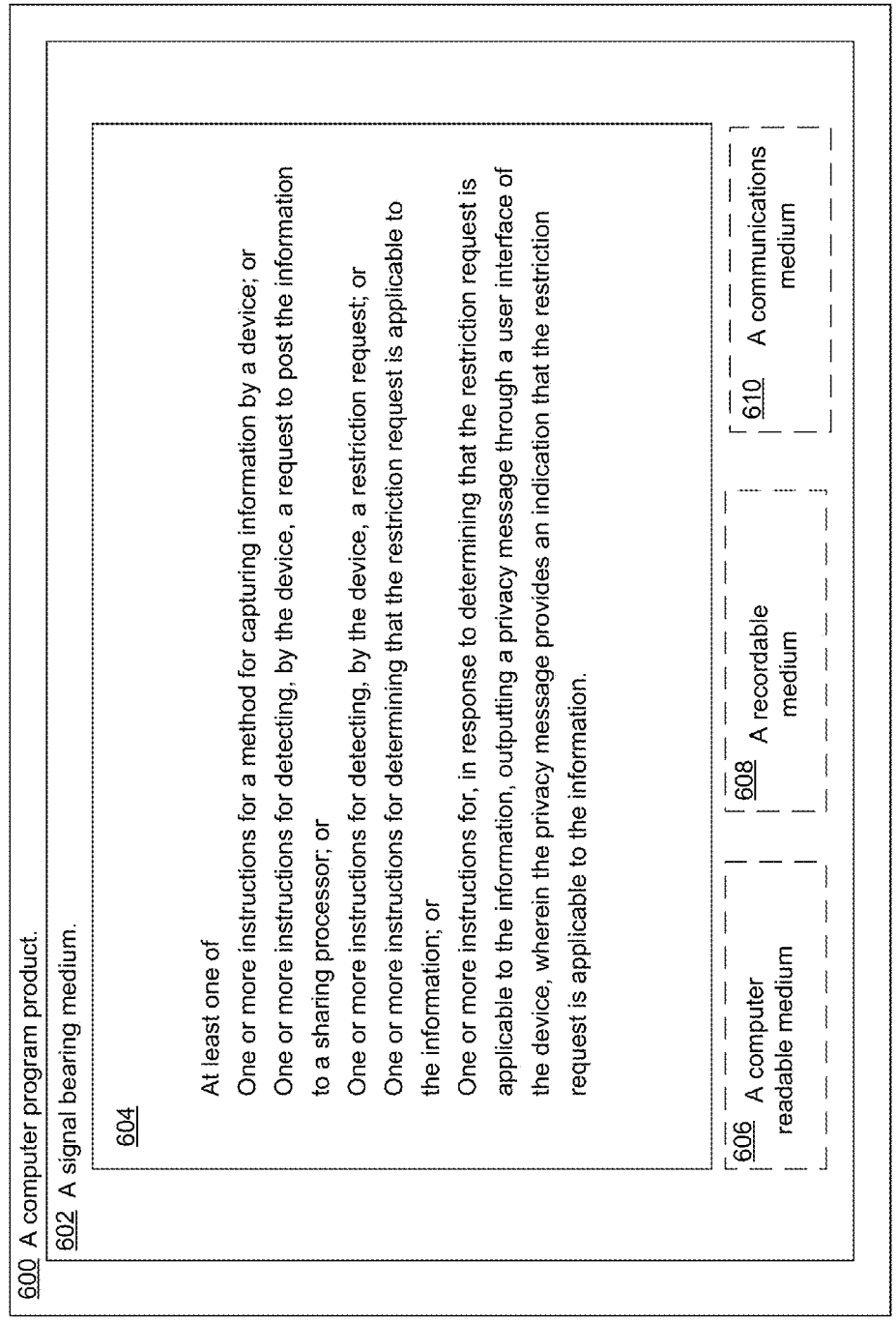
FIG. 6 illustrates a computer program product that can be utilized to implement restriction of posting information to sharing processors.

FIG. 6 illustrates an example computer program product 600 that can be utilized to implement restriction of posting information to sharing processors, arranged in accordance with at least some embodiments described herein. Program product 600 may include a signal bearing medium 602. Signal bearing medium 602 may include one or more instructions 604 that, when executed by, for example, a processor, may provide the functionality described above with respect to FIGS. 1-5. Thus, for example, referring to system 100, posting device 110 may undertake one or more of the blocks shown in FIG. 5 in response to instructions 604 conveyed to the system 100 by medium 602.

In some implementations, signal bearing medium 602 may encompass a computer-readable medium 606, such as, but not limited to, a hard disk drive, a Compact Disc (CD), a Digital Video Disk (DVD), a digital tape, memory, etc. In some implementations, signal bearing medium 602 may encompass a recordable medium 608, such as, but not limited to, memory, read/write (R/W) CDs, R/W DVDs, etc. In some implementations, signal bearing medium 602 may encompass a communications medium 610, such as, but not limited to, a digital and/or an analog communication medium (e.g., a fiber optic cable, a waveguide, a wired communications link, a wireless communication link, etc.). Thus, for example, computer program product 600 may be conveyed to posting device 110 by an RF signal bearing medium 602, where the signal bearing medium 602 is conveyed by a wireless communications medium 610 (e.g., a wireless communications medium conforming with the IEEE 802.11 standard).

FIG. 7 is a block diagram illustrating an example computing device 700 that is arranged to implement restriction of posting information to sharing processors, arranged in accordance with at least some embodiments described herein. In a very basic configuration 702, computing device 700 typically includes one or more processors 704 and a system memory 706. A memory bus 708 may be used for communicating between processor 704 and system memory 706.

Depending on the desired configuration, processor 704 may be of any type including but not limited to a microprocessor (µP), a microcontroller (µC), a digital signal processor (DSP), or any combination thereof. Processor 704 may include one more levels of caching, such as a level one cache 710 and a level two cache 712, a processor core 714, and registers 716. An example processor core 714 may include an arithmetic logic unit (ALU), a floating point unit (FPU), a digital signal processing core (DSP Core), or any combination thereof. An example memory controller 718 may also be used with processor 704, or in some implementations memory controller 718 may be an internal part of processor 704.

Depending on the desired configuration, system memory 706 may be of any type including but not limited to volatile memory (such as RAM), non-volatile memory (such as ROM, flash memory, etc.) or any combination thereof. System memory 706 may include an operating system 720, one or more applications 722, and program data 724. Application 722 may include a restriction of posting information algorithm 726 that is arranged to perform the functions as described herein including those described with respect to system 100. Program data 724 may include restriction of posting information data 728 that may be useful to implement restriction of posting information to sharing processors as is described herein. In some embodiments, application 722 may be arranged to operate with program data 724 on operating system 720 such that restriction of posting information to sharing processors may be provided. This described basic configuration 702 is illustrated in FIG. 7 by those components within the inner dashed line.

Computing device 700 may have additional features or functionality, and additional interfaces to facilitate communications between basic configuration 702 and any required devices and interfaces. For example, a bus/interface controller 730 may be used to facilitate communications between basic configuration 702 and one or more data storage devices 732 via a storage interface bus 734. Data storage devices 732 may be removable storage devices 736, non-removable storage devices 738, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 706, removable storage devices 736 and non-removable storage devices 738 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 700. Any such computer storage media may be part of computing device 700.

Computing device 700 may also include an interface bus 740 for facilitating communication from various interface devices (e.g., output devices 742, peripheral interfaces 744, and communication devices 746) to basic configuration 702 via bus/interface controller 730. Example output devices 742 include a graphics processing unit 748 and an audio processing unit 750, which may be configured to communicate to various external devices such as a display or speakers via one or more A/V ports 752. Example peripheral interfaces 744 include a serial interface controller 754 or a parallel interface controller 756, which may be configured to communicate with external devices such as input devices (e.g., keyboard, mouse, pen, voice input device, touch input device, etc.) or other peripheral devices (e.g., printer, scanner, etc.) via one or more I/O ports 758. An example communication device 746 includes a network controller 760, which may be arranged to facilitate communications with one or more other computing devices 762 over a network communication link via one or more communication ports 764.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 700 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 700 may also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments are possible. The various aspects and embodiments disclosed herein are for purposes of illustration and are not intended to be limiting, with the true scope and spirit being indicated by the following claims.

What is claimed is:

1. A method to process a request to restrict sending of information, the method comprising:
   capturing information by a device, including using a camera of the device to capture an image, wherein the device is at a location;

receiving, by the device, a request to send the information to a sharing processor;

receiving, by the device, a restriction request, wherein the restriction request relates to the location;

determining, by the device, that the restriction request is applicable to the information;

in response to determining that the restriction request is applicable to the information, outputting a privacy message to be viewed through a user interface of the device, wherein the privacy message provides an indication that the restriction request is applicable to the information requested to be sent to the sharing processor; and receiving a determination as to whether to proceed with sending the information to the sharing processor after the output of the privacy message.

2. The method of claim 1, wherein receiving the restriction request includes receiving, by the device, the restriction request from an other device over a network.

3. The method of claim 1, further comprising:
sending, by the device, a query for the restriction request to an other device over a network;
wherein receiving the restriction request includes receiving, by the device, the restriction request from the other device in response to the query for the restriction request.

4. The method of claim 1, further comprising:
searching, by the device, a network for an other device; and
sending, by the device, a query for the restriction request to the other device over the network;
wherein receiving the restriction request includes receiving, by the device, the restriction request from the other device in response to the query for the restriction request.

5. The method of claim 1, further comprising:
searching, by the device, a network for an other device; and
sending, by the device, a query for the restriction request to the other device over the network, wherein the query for the restriction request includes some portion of the captured information or data related to the captured information;
wherein receiving the restriction request includes receiving, by the device, the restriction request from the other device in response to the query for the restriction request.

6. The method of claim 1, further comprising, prior to receiving the request to send information to the sharing processor:
adding the restriction request to the information; and
storing the information and restriction request in the device.

7. The method of claim 1, wherein determining that the restriction request is applicable to the information includes comparing at least some of the information to the restriction request.

8. The method of claim 1, wherein capturing the information further includes capturing at least one of audio, text, and/or the location of the device.

9. The method of claim 1, wherein receiving the restriction request includes receiving a restriction request that specifies a type of restriction, a reason for the restriction, a type of information the restriction applies to, and/or a restriction sample.

10. A device effective to process a request to restrict sending of information, the device comprising:

an information capture device effective to capture information, wherein the information capture device includes a camera configured to capture an image, wherein the device is at a location;

a communication device that includes a communication port effective to:
receive a request to send the information to a sharing processor; and
receive a restriction request, wherein the restriction request relates to the location;

a user interface; and a processor configured to be in communication with the information capture device, with the communication device, and with the user interface, the processor effective to:
determine that the restriction request is applicable to the information;
in response to the determination that the restriction request is applicable to the information, output a privacy message to be viewed through the user interface, wherein the privacy message provides an indication that the restriction request is applicable to the information requested to be sent to the sharing processor; and
receive a determination as to whether to proceed to send the information to the sharing processor after the output of the privacy message.

11. The device of claim 10, wherein the communication device is effective to operate the communication port to receive the restriction request from an other device over a network.

12. The device of claim 10, wherein the communication device is effective to operate the communication port to:
send a query for the restriction request to an other device over a network; and
receive the restriction request from the other device in response to the query for the restriction request.

13. The device of claim 10, wherein the communication device is effective to:
search the network for an other device in the network;
operate the communication port to send a query for the restriction request to the other device over the network; and
operate the communication port to receive the restriction request from the other device in response to the query for the restriction request.

14. The device of claim 10, wherein the communication device is effective to:
search the network for an other device in the network;
operate the communication port to send a query for the restriction request to the other device over the network, wherein the request for the restriction request includes some portion of the captured information or data related to the captured information; and
operate the communication port to receive the restriction request from the other device in response to the query for the restriction request.

15. The device of claim 10, wherein the device further comprises a memory, and wherein the processor is effective to, prior to receipt of the request to send the information:
add the restriction request to the information; and
store the information and restriction request in the memory.

16. The device of claim 10, wherein the processor is effective to:

determine whether the restriction request is applicable to the information by comparison of least some of the information to the restriction request.

17. A system effective to restrict sending of information, the system comprising:
a first device at a location;
a second device configured to be in communication with the first device, the second device effective to send a restriction request, wherein the restriction request relates to the location;
the first device comprising:
a user interface;
a processor configured to be in communication with the user interface;
wherein the first device includes a camera and is effective to capture information at the location, wherein the information includes an image that can be captured by the camera; and
the processor is effective to:
receive a request to send the information to a sharing processor;
receive the restriction request;
determine that the restriction request is applicable to the information;
in response to the determination that the restriction request is applicable to the information, output a privacy message to be viewed through the user interface, wherein the privacy message provides an indication that the restriction request is applicable to the information requested to be sent to the sharing processor; and
receive a determination as to whether to proceed to send the information to the sharing processor after the output of the privacy message.

18. The system of claim 17, wherein:
the first device is configured to:
send a query for the restriction request to the second device; and
receive the restriction request from the second device in response to the query for the restriction request;
the second device is configured to:
receive the query for the restriction request from the first device; and
send the restriction request to the first device in response to the query for the restriction request.

19. The system of claim 17, wherein:
the first device is configured to:
search the network for the second device;
send a query for the restriction request to the second device over the network, wherein the query for the restriction request includes at least some of the captured information or data related to the captured information; and
receive the restriction request from the second device in response to the query for the restriction request;
the second device is configured to:
receive the query for the restriction request from the first device;
process the information or data related to the information included in the query for the restriction request to determine whether the restriction request is applicable to the information; and
in response to the determination that the restriction request is applicable to the information, send the restriction request to the first device over the network.

20. The system of claim 17, further comprising:
a third device configured to be in communication with the first device and the second device;
wherein:
the second device is effective to send the restriction request to the third device;
the third device is effective to store the restriction request;
the first device is effective to send a query for the restriction request to the third device over the network; and
the first device is effective to receive the restriction request from the third device in response to the query for the restriction request.

21. A computer program product, comprising computer-readable instructions stored in non-transitory computer-readable media, the computer-readable instructions operable, in response to execution by a processor, to control a first mobile device to:
capture information, including capture of an image by a camera of the first mobile device, wherein the first mobile device is at a location;
detect a request, from a first user of the first mobile device, to send the information to a sharing processor;
detect a restriction request, wherein the restriction request relates to the location, is specified by a second user that wants privacy control over the captured information, and is received from a second mobile device of the second user;
determine that the restriction request is applicable to the information;
in response to the determination that the restriction request is applicable to the information requested to be sent to the sharing processor, output a privacy message to be viewed by the first user through a user interface of the first mobile device, wherein the privacy message includes at least some of the restriction request and the privacy message is output on the user interface prior to a determination being made by the first user as to whether to operate the first mobile device to proceed to send the information to the sharing processor;
in response to the privacy message, operate the first mobile device to enable the first user to choose from multiple options displayed on the user interface: accept the privacy message and so refrain from sending the information to the sharing processor, ignore the privacy message and so send the information to the sharing processor, or request more detail relating to the restriction request from the second mobile device; and
receive a determination as to whether to proceed to send the information to the sharing processor after the output of the privacy message.

22. The computer program product of claim 21, comprising further instructions operable, in response to execution by the processor, to control the first mobile device to:
search a network for the second mobile device;
send a query for the restriction request to the second mobile device over the network, where the query for the restriction request includes some portion of the captured information or data related to the captured information; and
process the restriction request from the second mobile device in response to the query for the restriction request.

23. The computer program product of claim 21, comprising further instructions operable, in response to execution by the processor, to control the first mobile device to:

add the restriction request to the information; and
store the information and the restriction request in the first mobile device.

24. The computer program product of claim 21, wherein to determine that the restriction request is applicable to the information, the computer-readable instructions are operable, in response to execution by the processor, to control the first mobile device to compare at least some of the information to the restriction request.

\* \* \* \* \*